United States Patent
Mace et al.

(10) Patent No.: US 8,535,011 B2
(45) Date of Patent: Sep. 17, 2013

(54) SHIM FOR A TURBOMACHINE BLADE

(75) Inventors: Jérôme Mace, Cesson (FR); Thierry Nitre, Tigery (FR); Patrick Reghezza, Vaux le Penil (FR)

(73) Assignee: SNECMA, Paris (FR)

( * ) Notice: Subject to any disclaimer, the term of this patent is extended or adjusted under 35 U.S.C. 154(b) by 981 days.

(21) Appl. No.: 12/236,872

(22) Filed: Sep. 24, 2008

(65) Prior Publication Data

US 2009/0081046 A1 Mar. 26, 2009

(30) Foreign Application Priority Data

Sep. 25, 2007 (FR) ...................................... 07 57810

(51) Int. Cl.
*B63H 1/20* (2006.01)

(52) U.S. Cl.
USPC ............... 416/219 R; 416/220 A; 416/204 A; 416/223 A

(58) Field of Classification Search
USPC .................. 416/219 R, 223 B, 176, 188, 221, 416/220 R, 220 A, 204 A, 223 A
See application file for complete search history.

(56) References Cited

U.S. PATENT DOCUMENTS

| 2,928,651 | A | | 3/1960 | Turnbull |
| 3,378,230 | A | * | 4/1968 | Toomey ........................ 416/221 |
| 3,598,503 | A | | 8/1971 | Muller |
| 6,431,835 | B1 | * | 8/2002 | Kolodziej et al. ......... 416/219 R |
| 7,938,626 | B2 | | 5/2011 | Forgue et al. |
| 2005/0092886 | A1 | * | 5/2005 | Mazieres ...................... 248/300 |
| 2008/0078845 | A1 | * | 4/2008 | Maier et al. .............. 239/265.39 |

FOREIGN PATENT DOCUMENTS

| DE | 1 025 421 | 3/1958 |
| EP | 0 341 455 A2 | 11/1989 |
| EP | 1 764 480 A1 | 3/2007 |
| JP | 2004-232642 | 8/2004 |
| JP | 2007-77993 | 3/2007 |

OTHER PUBLICATIONS

U.S. Appl. No. 13/265,200, filed Oct. 19, 2011, Rechezza et al.
Office Action issued Aug. 14, 2012, in Japanese Patent Application No. 2008-243716 (English-language translation only).

* cited by examiner

*Primary Examiner* — Nitin Parekh
(74) *Attorney, Agent, or Firm* — Oblon, Spivak, McClelland, Maier & Neustadt, L.L.P.

(57) ABSTRACT

Shim for a turbomachine blade, for covering the root of said blade, the shim comprising: two branches for covering the bearing surfaces of the blade root; a base interconnecting these branches; and at least one holder element located at one end of the shim and suitable for coming into contact with the blade root to retain the shim relative to the blade root, the shim further comprising, at its other end, at least one foolproofing element projecting from the base in the opposite direction to the branches. A turbomachine rotor assembly including such a shim.

5 Claims, 3 Drawing Sheets

SHIM FOR A TURBOMACHINE BLADE

FIELD OF THE INVENTION

The invention relates to a shim for a turbomachine blade. It is applicable to any type of turbomachine, whether for terrestrial or aviation purposes, and it applies most particularly to aviation turbojets.

More precisely, the invention relates to a shim for surrounding the root of a blade, the shim being of the type comprising: two branches for covering the bearing surfaces of the blade root; a base interconnecting the two branches; and at least one holder element situated at one end of the shim and suitable for coming into contact with the blade root to retain the shim relative to the blade root.

In the present application, an axial direction is defined as being a direction parallel to the axis of the rotation of the blades. In addition, the upstream and downstream sides of a part are defined relative to the normal flow direction of gas passing between the blades.

BACKGROUND OF THE INVENTION

A known example of shim of the above-specified type is shown in FIG. 1. The shim 10 comprises two branches 14 and a base 12 interconnecting the two branches 14. It also comprises at one of its ends 10a, a holder tongue 16. The holder tongue 16 projects from the edge 12a of the base 12 and is folded to extend between the branches 14.

FIG. 2 is a fragmentary exploded view showing a known rotor assembly 20 forming part of a fan module of an airplane turbojet. The assembly 20 comprises a rotor disk 21 presenting recesses or slots 22 in its outer periphery, and for each recess 22: a blade 25 fastened via its root 26 in the recess 22; a shim 10 of the kind shown in FIG. 1; a spacer 28; and a latch 30. The rotor assembly 20 is shown in the assembled state in FIG. 3.

To assemble the assembly 20, the shim 10 is initially mounted on the blade root 26, being slipped thereon from the upstream side of the blade, along arrow F (see FIG. 2). The shim 10 thus surrounds the blade root 26, with the branches 14 of the shim respectively covering the bearing surfaces 26a of the blade root. The bearing surfaces 26a of the blade root 26 and the bearing surfaces 22a of the recesses 22 are those surfaces of the blade roots 26 and of the recesses 22 (i.e. of the disk 21) that come into abutment against one another under the effect of centrifugal forces during rotation of the assembly 20.

Thereafter, the blade root 26 carrying the shim 10 is slotted into a recess 22. On its downstream side, the blade 25 comes into abutment against a wall 27 of the drum of the low-pressure compressor of the turbojet (see FIG. 3).

The latch 30 is then put into position in front of the blade root 26 against the holder tongue 16 of the shim 10.

Finally, the spacer 28 is slid between the shim 10 and the bottom 22b of the recess 22. The latch 30 is then held between the upstream rim 28a of the spacer 28 and the blade root 26 in such a manner that the holder tongue 16 is held between the latch 30 and the blade root 26, thus preventing any axial movement of the shim 10 relative to the blade root 26.

The shim 10 is an intermediate part between the blade 25 and the rotor disk 21. It forms a kind of sock covering the root 26 of the blade 25 and it serves to fill in the clearance between the blade root 26 and the disk rotor 21. This clearance can exist from the beginning (i.e. from the design of the blade 25 and the disk 21), however it is mostly the result of the disk 21 being mechanically reworked during repair.

The following drawback often occurs with the prior art shim 10: because of its shape and its elasticity, it can happen that the shim 10 is erroneously mounted back to front, i.e. that it is engaged from the rear (i.e. the downstream end) of the blade 25 instead of being engaged from the front (i.e. the upstream end) thereof. Under such circumstances, the holder tongue 16 is situated downstream from the blade root 26 and is not held between the latch 30 and the blade root. The shim 10 is then not retained by the holder tongue 16 and can move axially. This back-to-front mounting of the shim 10 leads to the disk 21 being damaged due to the shim 10 bearing badly against the disk (more precisely due to the reduction in the contact areas between the shim and the disk), thereby making it necessary in the long run to replace the disk 21.

OBJECT AND SUMMARY OF THE INVENTION

An object of the invention is to mitigate that drawback.

This object is achieved by a shim for a turbomachine blade, the shim being for surrounding the root of the blade and comprising: two branches for covering the bearing surfaces of the blade root; a base interconnecting these branches; and, at one of its ends, at least one holder element suitable for coming into contact with the blade root to retain the shim relative to the blade root, the shim further comprising, at its other end, at least one foolproofing element projecting from the base in the opposite direction to the branches.

The shim of the invention is designed to form part of a turbomachine rotor assembly that also comprises: a rotor disk presenting recesses in its outer periphery; blades fastened via their roots in said recesses; and spacers, each spacer being disposed between the base of a shim and the bottom of a recess.

Said foolproofing element comprises simple means incorporated in the shim making it possible to see that the shim has been mounted back to front while the rotor assembly is being assembled. If the shim has been mounted back to front on the blade root, the foolproofing element prevents a spacer being slid between the base of the shim and the bottom of the recess.

In an embodiment, the foolproofing element is a tongue that projects from the edge of the base and that is folded in the opposite direction to the branches. Usually, this tongue is folded into a plane substantially perpendicular to the base. This embodiment has the advantage of being simple and inexpensive.

In another embodiment, the foolproofing element is a protuberance situated on the face of the base that faces away from the branches. By way of example, this protuberance is formed by deforming the base, by fastening another part on the base, or by cutting out a tongue in the base and folding said tongue away from the branches.

Naturally, the foolproofing element could be made in some other way, providing it prevents a spacer being slid between the base of the shim and the bottom of the recess when the shim has been mounted back to front on the blade root, and conversely allows the spacer to be slid when the shim has been mounted the right-way round.

In an embodiment, the holder element is a tongue that projects extending from the edge of one of the branches or of the base and that is folded to lie between the branches. Usually, this tongue is folded into a plane substantially perpendicular to the base.

In a first embodiment, the shim has only one tongue that projects from its base. In a second embodiment, the shim presents two tongues projecting respectively from each of its two branches, these tongues optionally being interconnected by another part, said part then preventing the tongues from unfolding.

Naturally, the holder element could be made differently, providing it is suitable for coming into contact with the blade root in order to retain the shim relative to the blade root. In particular, the holder element could be: a protuberance situated on the base face beside the branches; or a part extending between the branches; or a shoulder, etc.

BRIEF DESCRIPTION OF THE DRAWINGS

The invention and its advantages can be better understood on reading the following detailed description of an embodiment of the invention. The description refers to the accompanying figures, in which.

MORE DETAILED DESCRIPTION

Figure 1:
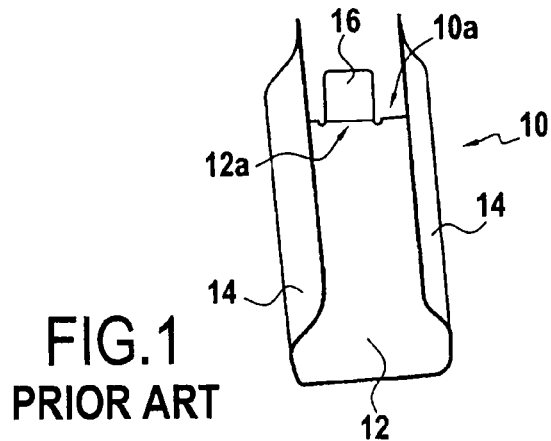
FIG. 1 is a perspective view of a known example of shim.
Figure 2:
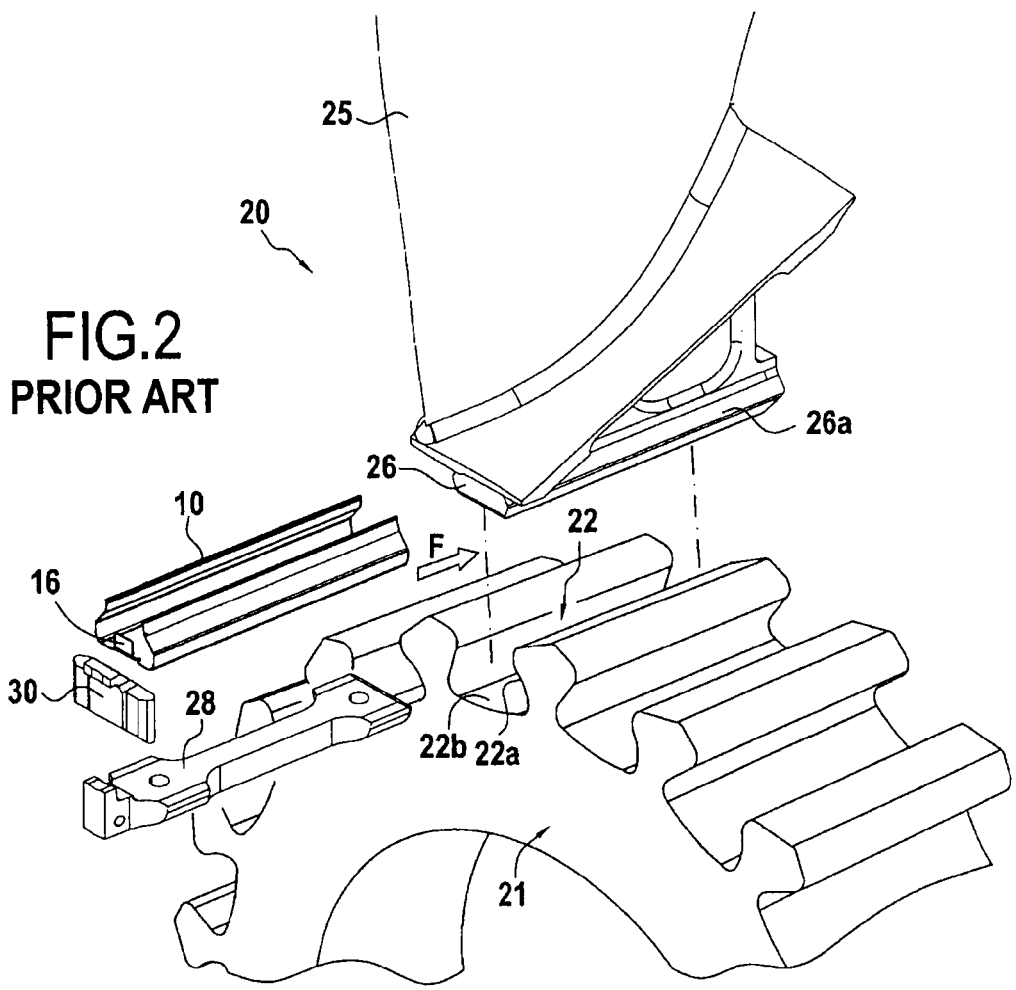
FIG. 2 is a fragmentary exploded view of a known example of rotor assembly including the shim of FIG. 1.
Figure 3:
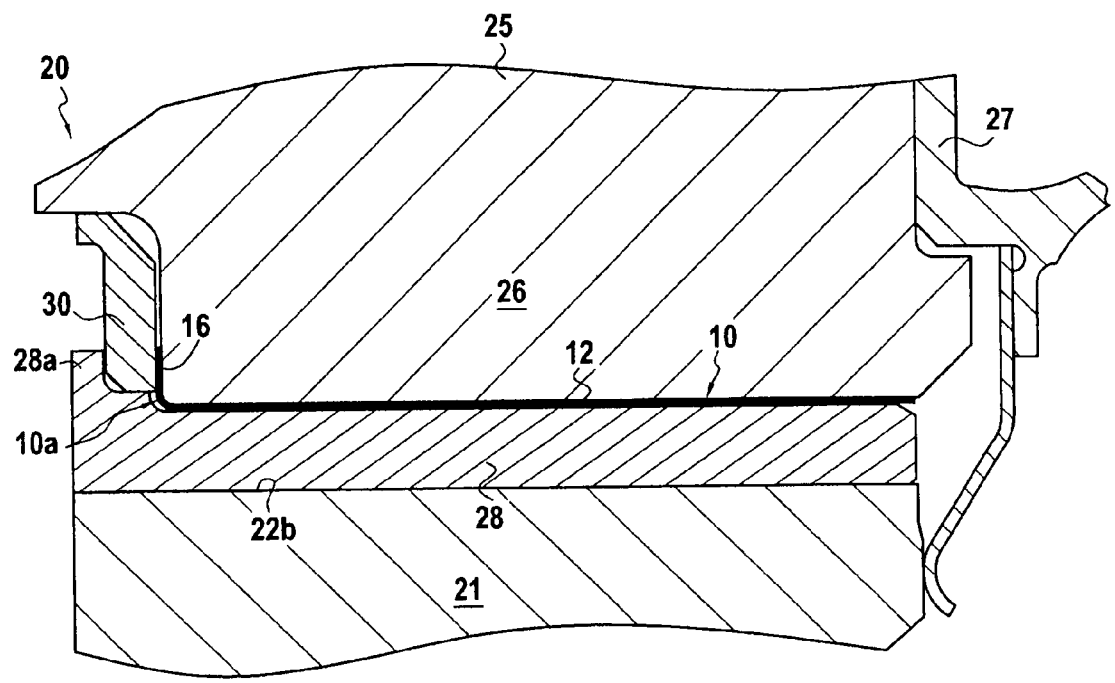
FIG. 3 is an axial section view showing the rotor assembly of FIG. 2, in the assembled state.

FIGS. 1 to 3 are described above and represent the prior art.

Elements and element portions that are analogous between FIGS. 1 to 3 and FIGS. 4 to 6 are identified by the same reference numerals plus 100.

Figure 4:
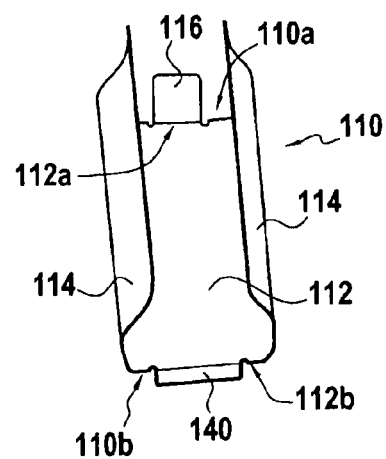
FIG. 4 is a perspective view of an example of shim of the invention.

The example shim 110 of FIG. 4 differs from that of FIG. 1 by the presence of foolproofing tongue 140 at its end 110b. This foolproofing tongue 140 extends from the edge 112b of the base 112 of the shim 110 and is folded away from the branches 114 of the shim 110. Thus, in FIG. 1, the foolproofing tongue 140 projects under the base 112 of the shim 110 when the branches 114 are situated above the base 112. It should be observed that the end 110b and the edge 112b are opposite from the end 110a and from the edge 112a carrying the holder tongue 116. In this example, the foolproofing tongue 140 extends over more than half the length of the edge 112b.

Figure 5:
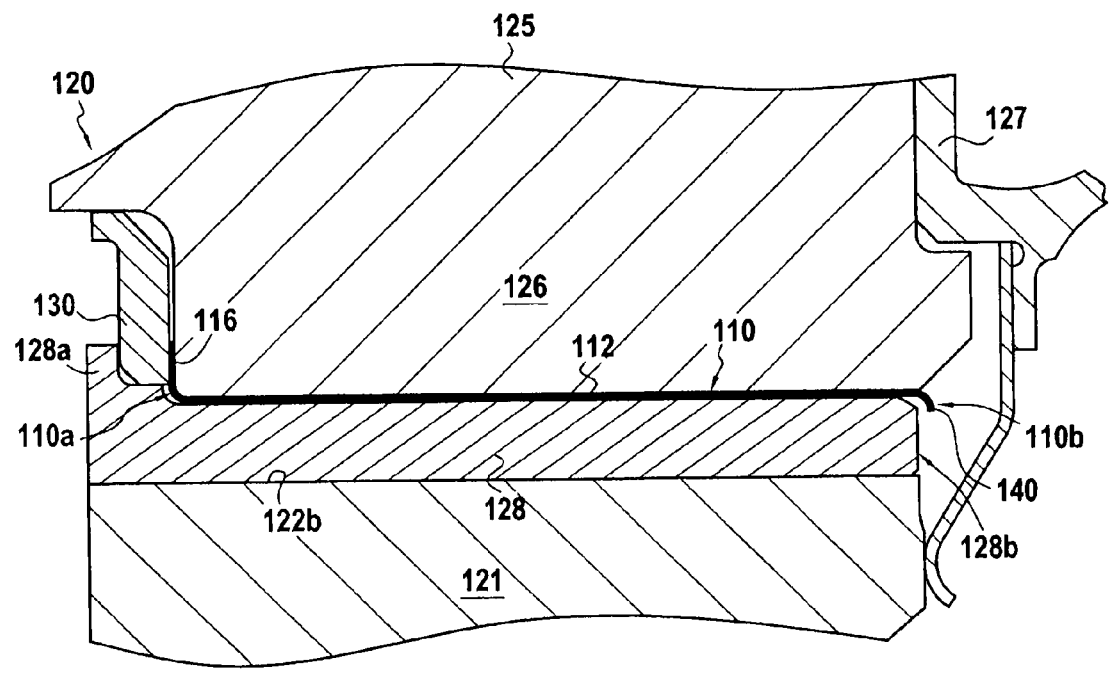
FIG. 5 is a fragmentary axial section of a rotor assembly in the assembled state, including the shim of FIG. 4.

The rotor assembly 120 of FIG. 5 differs from that of FIGS. 2 and 3 by virtue of its shim 110.

The rotor assembly 120 is assembled in analogous manner to the above-described assembly of FIGS. 2 and 3. In particular, the shim 110 is engaged on the root 126 of the blade 125 until the holder tongue 116 comes into abutment against the blade root 126. Then, the blade root 126 and the shim 110 surrounding it are engaged into the recess in the rotor disk 121. Then the latch 130 is put into position in front of the blade root 126 against the holder tongue 114 of the shim 110. Finally, the spacer 128 is slid between the base 112 of the shim and the bottom 122b of the recess. When the rotor assembly 120 is in the assembled state, axial movement of the shim 110 relative to the blade root 126 is prevented because the holder tongue 116 is retained between the blade root 126 and the latch 130 (itself retained by the upstream rim 128a of the spacer 128).

Figure 6:
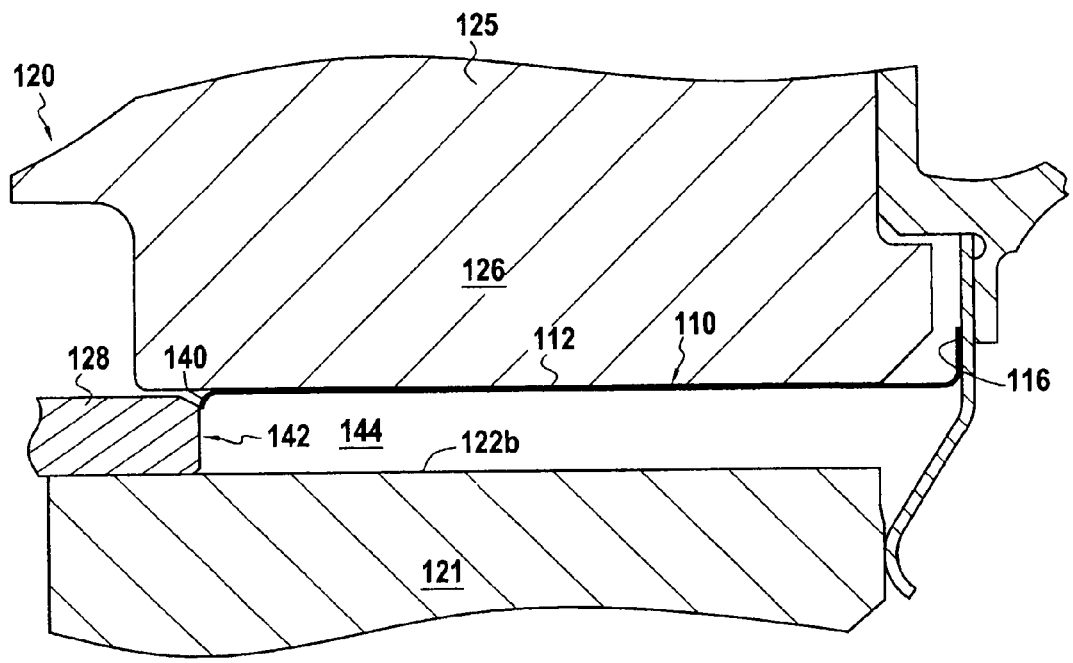
FIG. 6 is a view analogous to that of FIG. 5, the shim being mounted back to front.

The shim 110 is mounted the right-way round (i.e. properly) on the blade root 126 when it is slipped on from the front (i.e. from the upstream end) of the blade root 126. In FIG. 5, the shim 110 is mounted the right-way round. Conversely, the shim 110 is mounted back to front (i.e. wrongly) on the blade root 126 when it is engaged from the rear (i.e. from the downstream end) of the blade root 126. In FIG. 6, the shim 110 is mounted back to front.

With reference to FIG. 6, when the shim is mounted the wrong-way round, the foolproofing tongue 140 extends across the inlet orifice 142 to the housing 144 situated under the shim 110, between the base 112 of the shim and the bottom 122b of the recess, for the purpose of receiving the spacer 128. Thus, the foolproofing tongue 140 prevents the spacer 128 being inserted via the orifice 142. The foolproofing tongue 140 thus forms an abutment for the spacer 128, as shown in FIG. 6. In the extreme, if the spacer 128 were to be inserted by force, the foolproofing tongue 140 would deform and the spacer 128 would penetrate a short way into the housing 144 but would be prevented from penetrating fully therein. Generally, the shim 110 is made of a material that is relatively rigid and the foolproofing tongue 140 does not deform easily.

Conversely, as shown in FIG. 5, when the shim is mounted the right-way round, the spacer 128 slides without difficulty between the base 112 of the shim and the bottom 122b of the recess. When the spacer 128 is in place, the foolproofing tongue 140 covers the downstream end 128b of the spacer 128.

The shim 110 may be made by cutting out and folding sheet metal or metal alloy (e.g. the alloy sold under the trademark Inconel 718), of small thickness (e.g. 0.35 millimeters).

The foolproofing tongue 140 may be cut out and shaped at the same time as the other portions of the shim, such that the tongue 140 constitutes a foolproofing solution that is simple and inexpensive.

What is claimed is:

1. A turbomachine rotor assembly comprising:
   a rotor disk presenting recesses in its outer periphery;
   blades fastened via their root in said recesses;
   shims for the blades, each shim configured to surround a root of one blade and including
      two branches for covering bearing surfaces of the blade root;
      a base interconnecting the branches;
      at least one holder element situated at one end of the shim and suitable for coming into contact with the blade root to retain the shim relative to the blade root; and
      at least one foolproofing element situated at an other end of the shim and projecting from the base in an opposite direction to the branches; and
   spacers, each spacer being placed between the base of a shim and a bottom of a recess of the rotor disk.

2. The turbomachine rotor assembly according to claim 1, wherein the foolproofing element is a tongue that projects from the edge of the base and that is folded in an opposite direction to the branches.

3. The turbomachine rotor assembly according to claim 1, wherein the foolproofing element is a protuberance situated on a face of the base that faces away from the branches.

4. The turbomachine rotor assembly according to claim 1, wherein the holder element is a tongue that projects from an edge of one of the branches or of the base and that is folded to lie between the branches.

5. A turbomachine including a rotor assembly according to claim 1.

* * * * *